United States Patent [19]

Shennib

[11] Patent Number: 5,425,104
[45] Date of Patent: Jun. 13, 1995

[54] INCONSPICUOUS COMMUNICATION METHOD UTILIZING REMOTE ELECTROMAGNETIC DRIVE

[75] Inventor: Adnan A. Shennib, Fremont, Calif.

[73] Assignee: Resound Corporation, Redwood City, Calif.

[21] Appl. No.: 292,066

[22] Filed: Aug. 17, 1994

Related U.S. Application Data

[63] Continuation of Ser. No. 679,661, Apr. 1, 1991, abandoned.

[51] Int. Cl.⁶ .......................................... H04R 25/00
[52] U.S. Cl. ................................. 381/68; 381/68.3; 381/68.6
[58] Field of Search ............... 381/68, 68.6, 79, 68.2, 381/68.4, 68.3, 68.7; 128/1.6, 780, 419; 607/57; 600/25; 455/351, 41; 181/129, 135

[56] References Cited

U.S. PATENT DOCUMENTS

| | | | |
|---|---|---|---|
| 3,549,818 | 12/1970 | Turner et al. | 381/79 |
| 3,710,399 | 1/1973 | Hurst | 3/1 |
| 3,808,179 | 4/1974 | Gaylord | 260/86.1 |
| 3,985,977 | 10/1976 | Beaty et al. | 455/66 |
| 4,120,570 | 10/1978 | Gaylord | 351/40 |
| 4,248,989 | 2/1981 | Novicky | 526/264 |
| 4,303,772 | 12/1981 | Novicky | 526/279 |
| 4,334,315 | 6/1982 | Ono et al. | 455/11 |
| 4,357,497 | 11/1982 | Hochmair et al. | 179/107 E |
| 4,380,689 | 4/1983 | Giannetti | 179/114 R |
| 4,428,377 | 1/1984 | Zollner et al. | 128/419 |
| 4,540,761 | 9/1985 | Kawamura et al. | 526/245 |
| 4,556,122 | 12/1985 | Goode | 181/136 |
| 4,611,598 | 9/1986 | Hortmann et al. | 128/419 |
| 4,628,907 | 12/1986 | Epley | 128/86 |
| 4,696,287 | 9/1987 | Hortmann et al. | 128/1 R |
| 4,741,339 | 5/1988 | Harrison et al. | 128/419 |
| 4,756,312 | 7/1988 | Epely | 381/68.6 |
| 4,774,933 | 10/1988 | Hough et al. | 600/25 |
| 4,776,322 | 10/1988 | Hough et al. | 128/1.6 |
| 4,800,884 | 1/1989 | Heide et al. | 128/419 |
| 4,817,607 | 4/1989 | Tatge | 128/419 |
| 4,840,178 | 6/1989 | Heide et al. | 128/419 |
| 4,932,405 | 6/1990 | Peeters et al. | 128/419 |
| 4,936,305 | 6/1990 | Ashtiani | 600/25 |
| 4,944,301 | 7/1990 | Widin et al. | 128/420.6 |
| 4,948,855 | 8/1990 | Novicky | 526/279 |
| 4,957,478 | 9/1990 | Maniglia | 128/419 R |
| 5,003,608 | 3/1991 | Carlson | 381/68.6 |
| 5,012,520 | 4/1991 | Steeger | 600/25 |
| 5,015,224 | 5/1991 | Maniglia | 600/25 |
| 5,015,225 | 5/1991 | Hough et al. | 600/25 |
| 5,163,957 | 11/1992 | Sade et al. | 623/10 |
| 5,259,032 | 11/1993 | Perkins et al. | 381/68 |

FOREIGN PATENT DOCUMENTS

| | | | |
|---|---|---|---|
| 0296092 | 12/1988 | European Pat. Off. | 381/79 |
| 296092A2 | 12/1988 | European Pat. Off. | H04B 5/00 |
| 2455820 | 11/1980 | France | H04B 5/00 |
| 2044870 | 3/1972 | Germany | H04B 5/00 |
| 3243850A1 | 5/1984 | Germany | H01F 17/02 |

OTHER PUBLICATIONS

Goode, R. L., Audition via Electromagnetic Induction, Arc. Otolaryngol. (1973), 98, 23–26.

Goode, R. L., Current Status of Electromagnetic Implantable Hearing Aids, Otolaryngologic Clinic of North America (1989) 22(1), 201–209.

Rutschmann, J., Magnetic Auditon—Auditory Stimulation by Means of Alternating Magnetic Fields Acting on a Permanent Magnet Fixed to the Eardrum, IRE Transactions on Medical Electronics (1959), 6, 22–23.

(List continued on next page.)

Primary Examiner—Curtis Kuntz
Assistant Examiner—Huyen D. Le
Attorney, Agent, or Firm—Coudert Brothers

[57] ABSTRACT

An inconspicuous hearing system is described that uses a coil to electromagnetically couple with, and therefore drive, a permanent magnet attached to the tympanic membrane or ossicular chain. This hearing system enables hearing impaired individuals, as well as persons with normal hearing, to selectively receive sound signals in a wide variety of hearing environments while avoiding socially or aesthetically unacceptable stigmas associated with visible wires, headphones, earpieces, etc.

20 Claims, 5 Drawing Sheets

OTHER PUBLICATIONS

Bjorab, et al., "Semi-Implantable Hearing Device: A Preliminary Report," Presented at the Middle Section Meeting of the Triologic Socitey, Jan. 24, 1988, pp. 1–19.

Heide, et al., "Development of a Semi-Implantable Hearing Device," *Advanced Audiology*, vol. 4, pp. 1–12.

Maniglia, et al., "Electromagnetic Implantable Middle Ear Hearing Device of the Ossicular-Stimulating Type Principles, Designs, and Experiments," 1988, pp. 3–16.

Rutchmann, "Magnetic Audition—Auditory Stimulation by Means of Alternating Magnetic Fields Acting on a Permanent magnet Fixed to the Eardrum," 1959, pp. 22–23.

Decremer, et al., "Shape and Derived Geometrical Parameters of the Adult, Hman Tympanic Membrane Measured with a Phase-Shift Moire Interferometer," 1991, pp. 107–122.

Wilska, A., "A Direct Method For Determining Threshold Amplitudes of the Eardrum at Various Frequencies, *In Kobrak* HG (ed): The Middle Ear. Chicago, University of Chicago Press," 1959, pp. 76–79.

Kinloch, A. J., *Adhesion and Adhesives Science and Technology*, 1st Ed., Chapman and Hall, Cambridge University Press, London, (1987), p. 185.

Goode, et al., "Audition via Electromagnetic Induction," *Arch Otolaryngol.* vol. 98, Jul. 1975, pp. 23–26.

Richard L. Goode, M. D., "Current Status of electromagnetic Implantable Hearing Aids," *Otology—Current Concepts and Technology*, 1989, pp. 201–209.

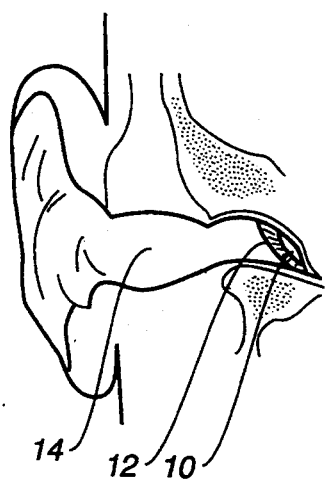
FIG._1B
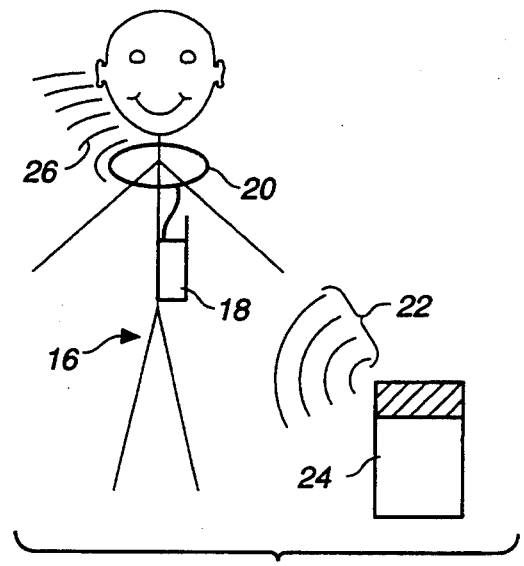
FIG._1A
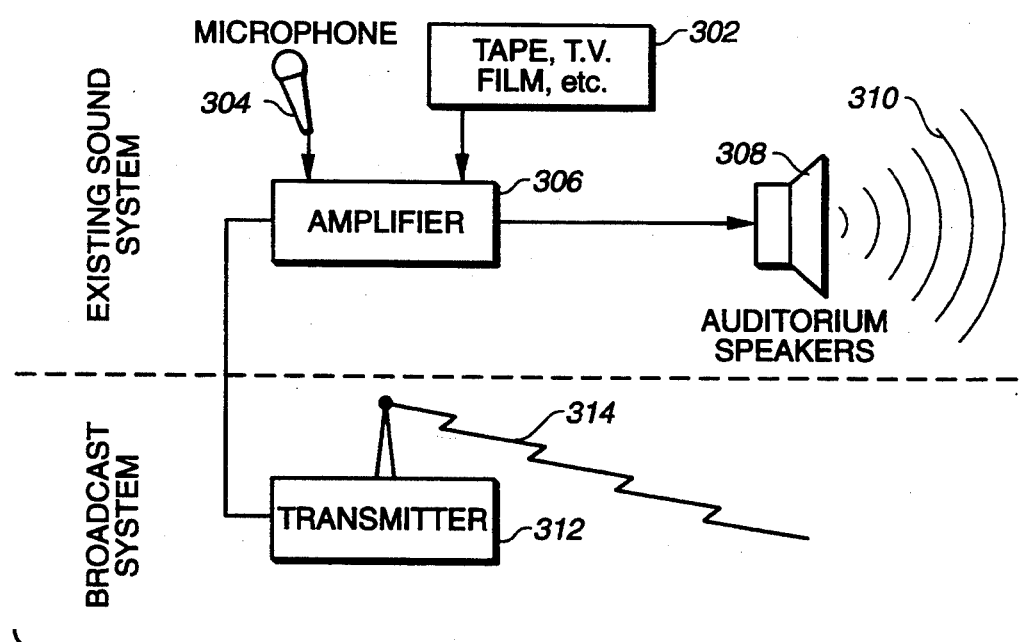
FIG._3A

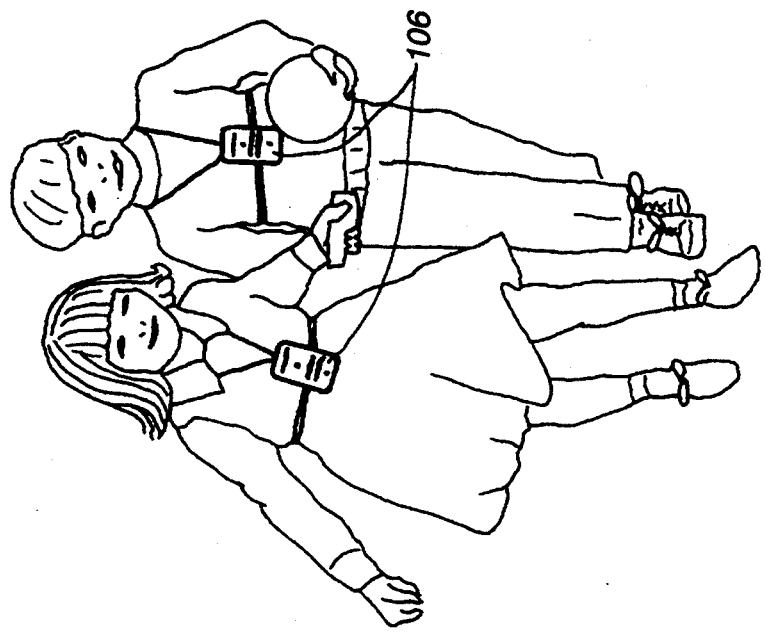
FIG._2B
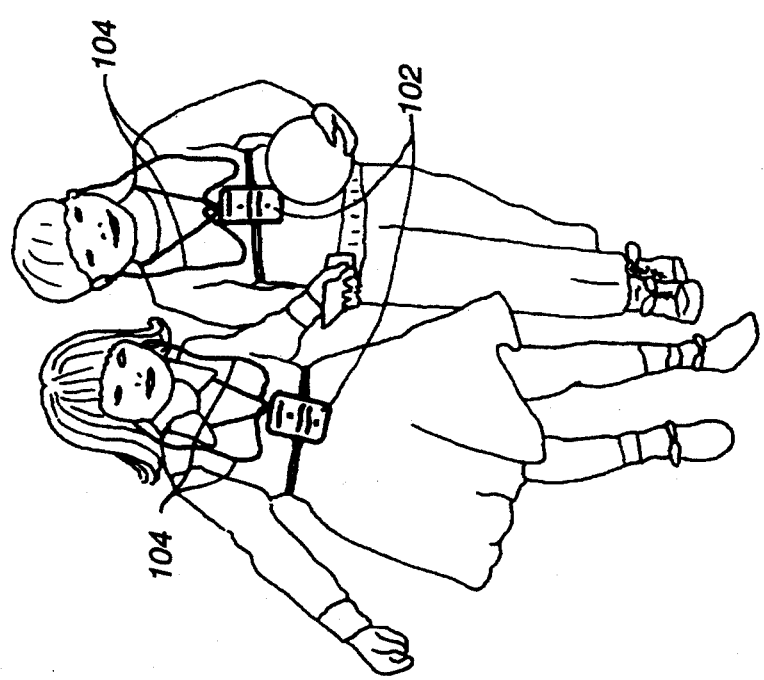
FIG._2A

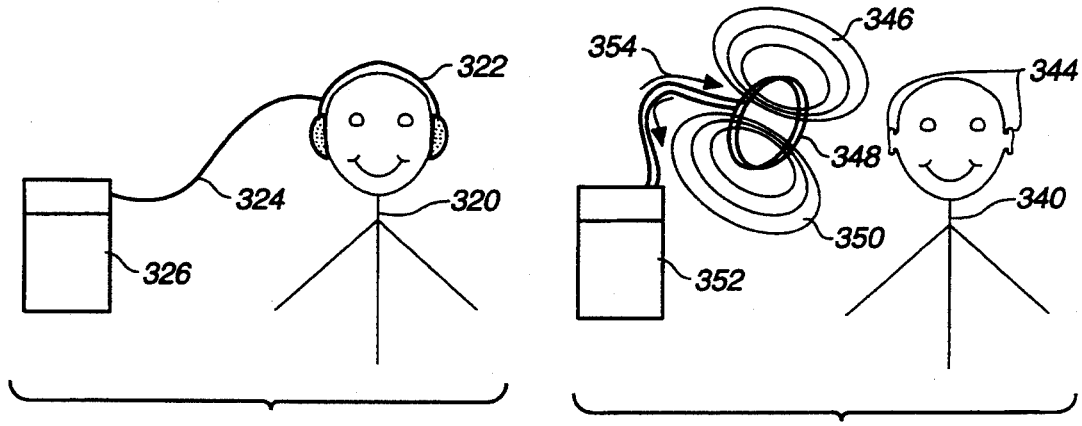
FIG._3B          FIG._3C
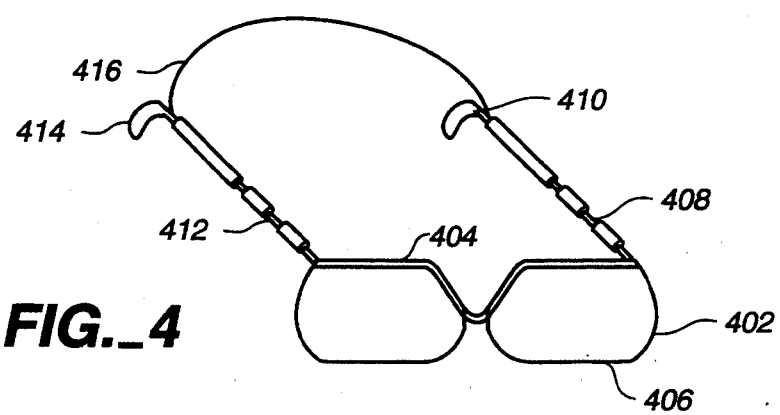
FIG._4
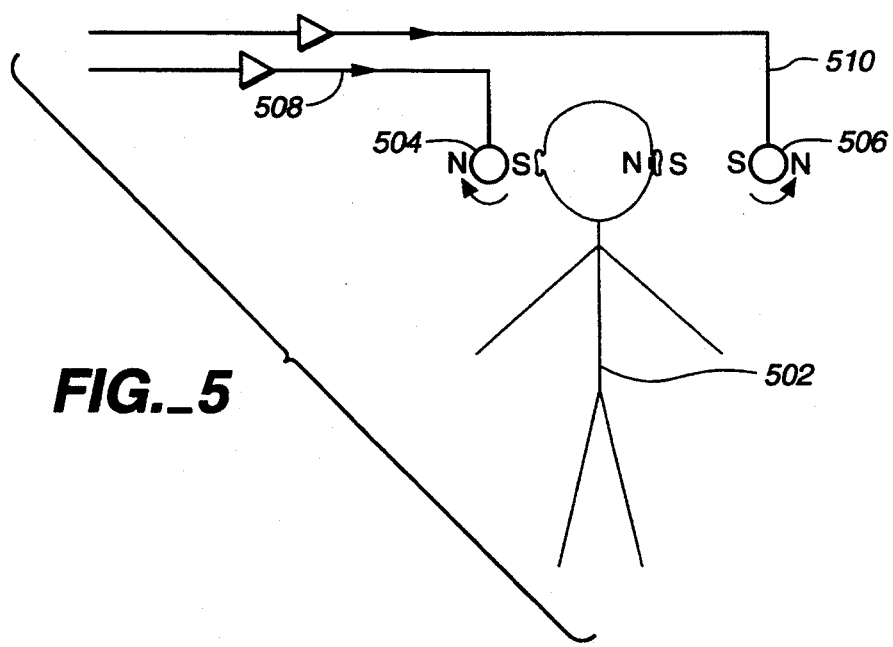
FIG._5

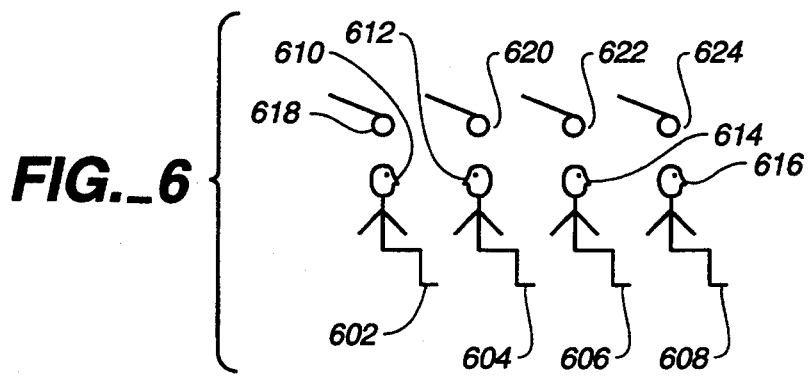
FIG._6
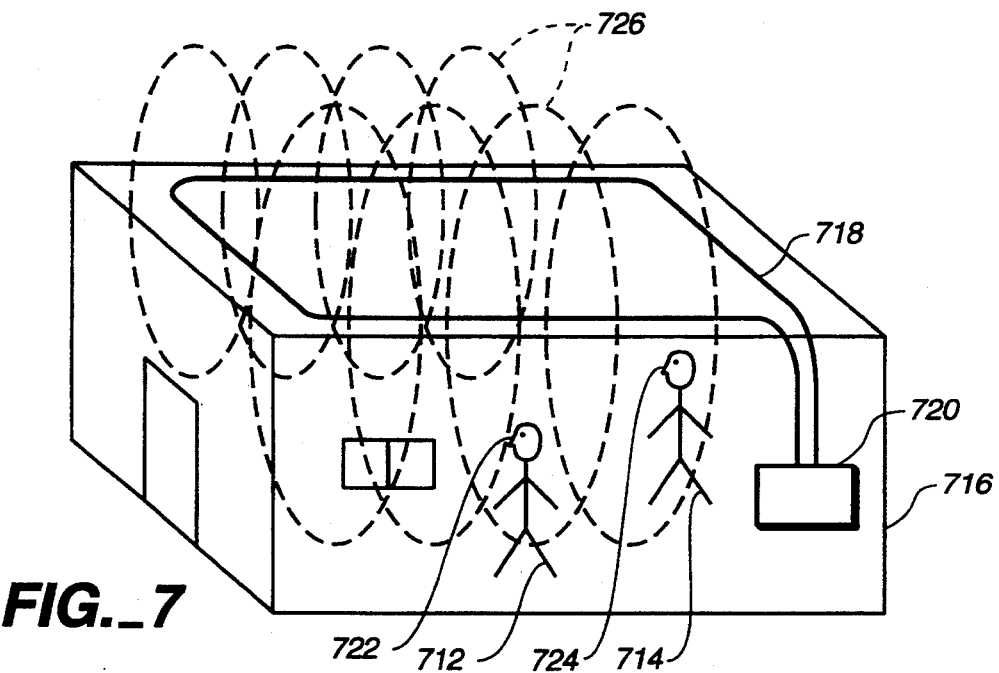
FIG._7
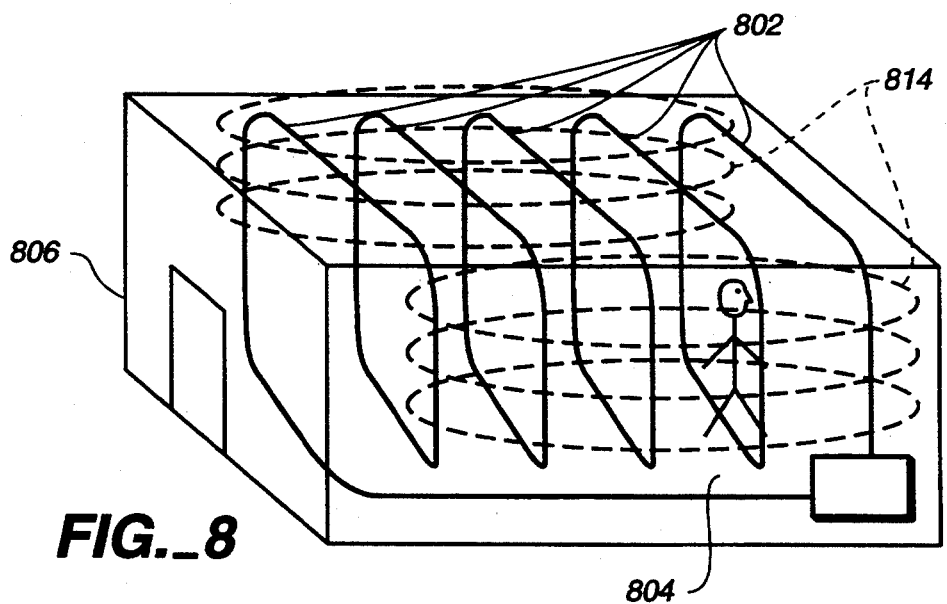
FIG._8

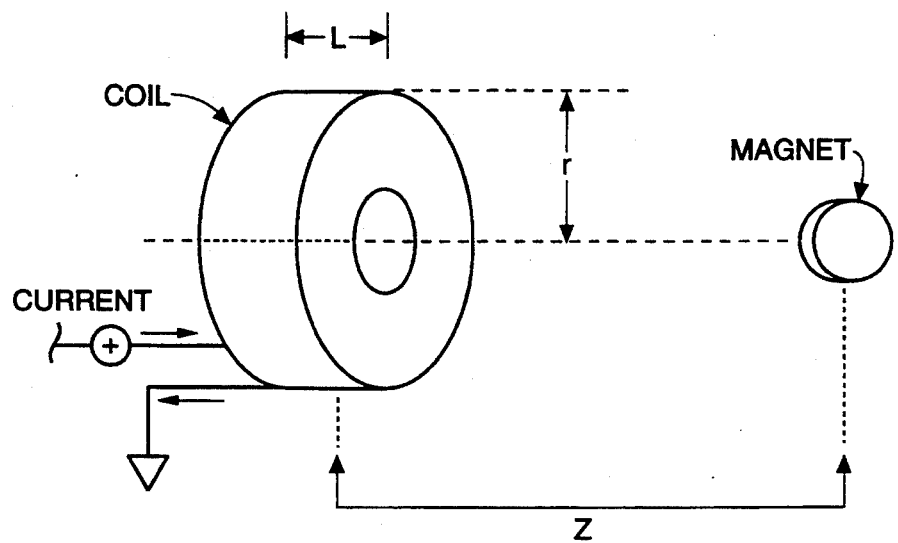
FIG._9
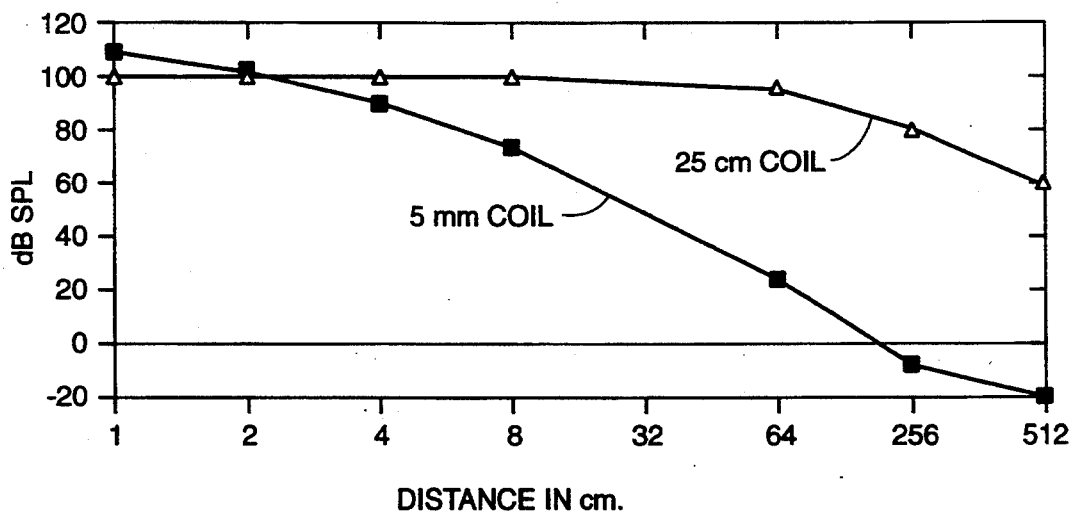
FIG._10

INCONSPICUOUS COMMUNICATION METHOD UTILIZING REMOTE ELECTROMAGNETIC DRIVE

This application s a continuation of application Ser. No. 07/679,661, Apr. 1, 1991, now abandoned.

BACKGROUND OF THE INVENTION

The present invention relates generally to hearing systems and, more particularly, to a hearing system that relies on electromagnetic fields to produce vibrations on a portion of the human ear. Such systems may be used to enhance the hearing of persons with normal or impaired hearing.

Hearing systems which rely on amplified acoustic drive output are well known in the prior art. For example, public address (PA) systems used in auditoriums or concert halls provide sounds to an audience with normal hearing by widespread production of amplified acoustic information in the form of sound waves. Such systems, however, are incapable of selectively imparting audio information to some nearby individuals but not to others. If amplification of such systems is increased so as to enable hearing impaired individuals to receive the information, the volume may be too loud for persons with normal hearing.

Another type of acoustic drive sound system is exemplified by the commonly available acoustic hearing aid. Such devices rely on acoustic output provided by a miniature speaker typically located within the wearer's ear canal, and positioned adjacent to the ear drum. In many cases, a portion of the acoustic output feeds back to the input of the device, causing a self-sustained oscillation. This "feedback" phenomenon, which is generally proportional to the magnitude of the gain, imposes limitations on the amount of gain available to the wearer. As a result, many hearing impaired individuals cannot benefit from such devices. This is especially true for severely hearing impaired individuals, where high acoustic gain requirements result in unacceptable levels of acoustic feedback.

Some prior art hearing systems have utilized electromagnetic energy to vibrate the middle ear structures or the tympanic membrane. An example of this may be found in U.S. Pat. No. 4,957,478 to Maniglia. The Maniglia system uses a hearing device consisting of a microphone, an amplifier, a power source, and an electromagnetic coil placed in the external auditory canal for receiving sound waves and converting them into magnetic fields. A permanent magnet is surgically implanted onto a portion of the bones of the ossicular chain of the individual. The magnet responds to the applied magnetic field, and causes the bones of the ossicular chain to vibrate with the same frequency and amplitude variation as the incoming signal at the microphone. In an alternate embodiment, a radio frequency (RF) signal is externally modulated by a sound signal. The resulting signal is then transmitted through an external coil worn behind the ear to a coil implanted in the mastoid cavity. The mastoid cavity coil decodes the signal to retrieve the original signal, which is then applied to a third coil which vibrates the implanted magnet, resulting in the perception of sound. In the above cases, as well as others not mentioned here, a considerable amount of conspicuous hardware is required for the system to operate. Additional disadvantages include surgical intervention with its various associated risks.

Another type of system proposed by the prior art (Rutschmann, 1959; Goode, 1973) utilizes a small magnet glued or otherwise attached to the tympanic membrane. A coil placed inside or just outside the external auditory canal is driven by currents to produce electromagnetic fields which vibrate the magnet attached to the tympanic membrane. In the case of the Rutschmann system, the current requirement was impractically high for hearing threshholds. The Goode system, on the other hand, provided some improvements in terms of power consumption, but the requirements were still impractically high. Power consumption and other limitations related to coil and magnet design made it necessary, in those systems, to place the coils in close proximity to the magnet.

It is therefore an object of the present invention to provide an improved hearing system.

Another object of the invention is to provide an improved hearing system which is capable of vibrating a magnet subjected to electromagnetic fields produced by a coil which is positioned outside of the ear canal of an individual.

Another object of the invention is to provide an improved hearing system which is capable of conveying information to an individual in a completely inconspicuous way.

It is a further object of the invention to provide an improved hearing system which is capable of conveying audio information to an individual in a manner which is selective to the wearer and substantially unaffected by ambient sound.

Still another object of the invention is to provide an improved hearing system for transmitting audio information to an individual.

Other objects of the invention will become apparent to those skilled in the art from the following description and accompanying drawings.

SUMMARY OF THE INVENTION

The hearing system of the invention includes a permanent magnet adapted to be directly coupled to the tympanic membrane of an individual. Drive means establish and vary an electromagnetic field to impart vibrations at audio frequencies to the permanent magnet to produce an audible response in the individual. The drive means include an air core coil larger than a individual's head and adapted to be supported in relation to the permanent magnet such that the permanent magnet is within the electromagnetic field produced by the coil. The driving means further include a source of current corresponding to audio signals for flow through the coil. The audio signals correspond to actual sound, such as human speech, music, etc. In a preferred form, the permanent magnet is part of a contact transducer assembly as defined below.

BRIEF DESCRIPTION OF THE DRAWINGS

FIGS. 1A and 1B illustrate a prototype system for a hearing device according to one embodiment of the current invention;

FIGS. 2A and 2B illustrate body-worn hearing systems: View A shows an acoustic body-worn hearing aid of the prior art; and View B shows an electromagnetic drive body-worn hearing aid according to one embodiment of the current invention.

FIGS. 3A, 3B and 3C illustrate a broadcast system and methods of sound perception: View A shows a conventional broadcast system; View B shows an acoustic listening device of the prior art; and View C shows an inconspicuous electromagnetic drive hearing system according to the current invention.

FIG. 4 shows a coil design for one embodiment of an inconspicuous communication system of the current invention;

FIG. 5 shows a coil design for a second embodiment of the inconspicuous communication system of the current invention;

FIG. 6 shows a coil design for a third embodiment of the inconspicuous communication system of the current invention;

FIG. 7 schematically illustrates a coil wiring scheme for an entire room according to an embodiment of the inconspicuous communication system of the current invention;

FIG. 8 schematically illustrates an alternate coil wiring scheme for an entire room according to an embodiment of the inconspicuous communication system of the current invention.

FIG. 9 is a diagram of an electromagnetic coil and a permanent magnet illustrating the parameters used to define their interactions.

FIG. 10 is a graph illustrating the relationship between the distance between an electromagnetic coil and a permanent magnet and the sound level produced by the magnet in response to an electromagnetic signal in the coil, for two different coil arrangements.

DEFINITIONS

In the present specification and claims, reference will be made to phrases and terms of art which are expressly defined for use herein as follows:

As used herein, a contact transducer assembly means a device which may be weakly and removably affixed to the tympanic membrane of the wearer by surface adhesion. The contact transducer assembly comprises a transducer which is responsive to appropriate energy signals to produce vibrations that contain audio information. The transducer is supported, at least in part, by a biocompatible structure with a surface area sufficient to support the transducer, and is vibrationally coupled to the tympanic membrane. The wearer of a contact transducer assembly can conveniently and facilely install or remove the assembly when a particular application has ended, or for routine cleaning, maintenance, etc. The installation and removal of a contact transducer assembly is much like the method for insertion and removal of conventional contact lenses.

As used herein, a high energy permanent magnet includes rare earth permanent magnets such as samarium-cobalt, neodymium-iron-boron or any other high energy permanent magnet material as appropriate.

As used herein, remote or remotely positioned means the spatial relationships between a contact transducer assembly positioned on the tympanic membrane of an individual, and a coil located outside of the external auditory canal or external to the individual.

As used herein, a support means is a biocompatible structure with an appropriate area to non-invasively attach a transducer to a portion of the ear without the need for hardening adhesives such as glue, or the need for such surgical procedures as insertion into the tympanic membrane, connection with malleus clips, or placement on, among, or around bones of the middle ear. By contrast, the support means can be facilely installed and removed by an individual with minimal effort, and has elements which are easily taken on and off by a user. The support means uses the phenomenon of surface adhesion to weakly but sufficiently attach an electromagnetic transducer on the tympanic membrane without being displaced when it is vibrated, or when an individual's head or body experiences motion or vibration.

As used herein, a transducer may comprise a magnet or a coil or multiple coils, piezoelectric elements, passive or active electronic components in discrete, integrated, or hybrid form, or any singular component or combination of components that will impart vibrational motion to the tympanic membrane or other portion of the body in response to appropriately received signals or any other means suitable for converting signals means to vibrations.

As used herein, a transmission means is any electronic device that processes acoustic or other meaningful signals and transmits it electromagnetically via a coil or an antenna.

DETAILED DESCRIPTION OF THE INVENTION

It is well known in the prior art that sound energy can be generated in response to electronic signals. Speakers used in radios, hearing aids, telephones, etc. are all examples of such transducers where electrical energy is transformed into acoustic energy. Furthermore, the driving electrical signals have frequency and amplitude variations that correspond to a meaningful source signal such as speech, tones, etc. Therefore, the acoustic output ultimately mirrors the original source signals with some desired processing effects such as amplification, filtering, compression, etc.

Electromagnetic hearing systems rely on electrical signals to produce electromagnetic energy rather than acoustic energy. This electromagnetic energy has the same amplitude and frequency variation characteristics as the driving electrical signal. Subsequently, these electromagnetic fields induce vibrations of the magnet attached to the eardrum and produce audible sounds of the same characteristics as the original source signals.

In a preferred form of the invention, the magnet worn by the individual is positioned on the tympanic membrane as part of a contact transducer assembly as herein defined and as shown and described in coassigned U.S. Pat. No. 5,259,032.

The coils that produce the magnetic fields are characteristically "remote" from the transducer assembly, in that they are not within close physical proximity, or connected to a transducer assembly by tangible means. The transducer assembly may be worn on a portion of the body, and is usually worn in the ear canal, typically placed against the tympanic membrane. Vibrational motions of the transducer assembly are perceived by an individual as sound. The hearing system of the current invention thus allows private sound perception without visible appliances or other connective hardware placed in or about the ear. Furthermore, the current invention permits hands-free operation of a sound system which may be heard only by persons wearing the appropriate inconspicuous device.

The research that led to the development of the current invention was initially undertaken to maximize magnetic flux densities from coils placed proximate to a magnet in order to sufficiently vibrate the magnet to compensate for hearing impairment. Coils were to be placed in close proximity to magnets in order to maximize vibrations while consuming minimal electric power. The concern for minimum power was prompted by the restrictive amount of space available for placing batteries within hearing aids. The placement and configuration of such coils for optimal sound quality and clarity are complex problems.

The current invention stemmed from the determination that a magnetic field of sufficient density to stimulate the magnet of a contact transducer assembly and produce sufficient sound perception could be generated by a coil positioned remotely from the magnet. This determination opened a variety of possible system configurations and applications not readily apparent from the more limited hearing aid application.

The coil and signal producing means and magnet or transducer assembly of the present invention will be described in greater detail below with reference to the accompanying Figures. It should be noted that wherever like numerals appear, they are employed to designate like parts throughout the Figures.

The magnetic field density (B) produced by a coil of solenoid shape (see FIG. 9) decreases as a function of distance (z) from the center of the coil as described by the equation:

$$B = (0.5)u_0 n' i \left[ \frac{z + \frac{L}{2}}{\sqrt{\left(r^2 + \left(z + \frac{L}{2}\right)^2\right)}} - \frac{z - \frac{L}{2}}{\sqrt{\left(r^2 + \left(z - \frac{L}{2}\right)^2\right)}} \right]$$

where:
B is the magnetic field density;
$u_0$ is the permeability of free space equal to $4\pi \times 10^{-10}$ henries per meter;
n' is the number of turns per meter length;
is the current in amperes;
z is the distance from coil center to magnet center;
L is the length of the coil; and
r is the radius of the coil.

Using the above relation, it was empirically derived and verified that a sinusoidal flux density of 2 Gauss RMS at 1 kHz will vibrate a test magnet weighing 13 mg on the tympanic membrane with a force equivalent to 98 dB SPL.

A computer simulation program called GEOM-Far-Coils (written in Quick Basic®) was developed to compute the magnetic flux density produced as a function of coil geometry, the amount of current into the coil, and the distance from the center of the coil. The program also computes the DC resistance, inductance, frequency response, and power consumption. A copy of the said program is given in Table 1 below.

The coils of the present invention can be characterized as being compact, air cored, and larger than a person's head. Furthermore, the axial length of the coil is minimal and the inside diameter is maximal, typically approaching the outside diameter. The above characteristics lead us to formulate the following equation describing the magnetic flux density for the coils in the present invention:

$$B = \frac{\mu_0 i r^2}{2(r^2 + z^2)^{\frac{3}{2}}}$$

where:
B is the magnetic field density;
$u_0$ is the permeability of free space equal to $4\pi \times 10^{-10}$ henries per meter;
i is the current in amperes;
z is the distance from coil center to magnet center; and
r is the radius of the coil.

Using computer simulation, the prior art in-the-canal coils were compared to the loop coils of the present invention. The results indicated that adequate magnet vibrations could be achieved at distances considerably further than those of the prior art-close proximity electromagnetic coils. This is shown in FIG. 10 where an example of each of the two coils in the comparison is plotted in terms of its expected equivalent sound pressure level versus distance. A typical small coil is 5 mm in diameter with a current consumption of 5 mA peak. The loop coil is about 25 cm in diameter and consumes about 1 Amp peak. Although the current consumption in the loop coil was considerably larger than that of the small coil, this represents a realistic power source availability since larger batteries and other power sources which are available can conceivably be used with electromagnetic systems that are outside of the ear. On the other hand, ear level electromagnetic hearing systems can only accommodate batteries that, compared to the present invention, are relatively much smaller.

This realization led to the development of a prototype system, which is incorporated into one embodiment of the inconspicuous hearing system of the current invention as shown schematically in FIG. 1. In FIG. 1, transducer assembly 10 is supported on tympanic membrane 12 in the ear canal 14 of an individual 16. Individual 16 wears receiver/amplifier unit 18. In one embodiment of the current invention, receiver/amplifier unit 18 may be a hand held FM receiver operating at 6 volts. In an alternate embodiment of the current invention, receiver/amplifier unit 18 may be a microphone/amplifier connected to a coil. Individual 16 in FIG. 1 wears coil 20 that is connected to receiver/amplifier unit 18.

In operation, FM radio frequency signals 22 from a wireless FM transmitter 24 of any suitable type known in the art are detected at FM receiver/amplifier unit 18. Receiver/amplifier unit 18, which may also be of any suitable type known in the art, in turn causes coil 20 to transmit magnetic field 26 corresponding to said audio signals. Remote transducer assembly 10 vibrates in response to magnetic field 26, thus causing vibrations to be experienced at tympanic membrane 12 to which transducer assembly 10 is attached. The result is that individual 16 perceives the audio-encoded FM radio frequency signals 22 as sounds.

An illustration of a body-worn acoustic hearing system according to the prior art is shown in View A of FIG. 2, and an electromagnetic drive body-worn hearing system according to the inconspicuous hearing system of the current invention is shown in View B. In View A, two children are shown wearing conventional body-worn acoustic hearing aids 102 with wires 104 leading to ear pieces worn in the ear. In View B of FIG. 2, both children are shown wearing electromagnetic drive hearing aids 106 according to the current invention that require no external wires and the coils are embedded in a neck loop.

In one clinical study using an embodiment of the current invention according to FIG. 1, a loop was made of 50 turns of number 30 wire, having a diameter of approximately 25 cm. This enabled the test subject to slip the coil around the head and have it rest on the neck as a necklace. The impedance of the coil was about 16 ohms.

The test subject had essentially normal hearing with just mild losses at high frequencies. Speech was transmitted through a wireless FM microphone transmitter from a remote location to the individual wearing the coil and holding the FM radio receiver. A clear comfortable sound was perceived as reported by the subject.

In a second clinical study of an embodiment of the current invention according to FIG. 1, a loop with 60 turns was tested on a hearing impaired person who had moderate hearing loss in the low frequency range (about 50 dB up to 4 kHz) and severe hearing loss at frequencies above 4 kHz. The individual also reported adequate sound level when the volume on the FM radio was increased to nearly its maximum level. Unfortunately, it was also reported that the quality of sound was not good, but very intelligible. This was due to the fact that the bandwidth in this latter example was limited to 1697 kHz due to the decreased current as a result of increased impedance of the coil (inductor) at higher frequencies.

The upper cut-off frequency ($F_{up}$) of an inductor-resistor equivalent circuit can then be predicted from the following equation:

$$F_{up}(in\ Hz) = R/(2\pi l)$$

where:

R is the resistance of the coil in ohms; and
l is the inductance in mH (milli Henries).

In the second example described above, R was 16 ohms and L was measured to be 1.5 mH. Variation of coil geometry and wire selection will therefore reduce inductance and subsequently improve frequency response. These and other clinical results achieved with the experiments described above clearly prove the application of this wireless, contactless, sound perception method for persons who are hearing impaired.

By optimizing the system carefully, in accordance with the foregoing described program, significant efficiency improvements are achieved. Given a supply voltage, a current drain, an optimizing coil impedance and geometry to maximize tympanic vibrations, every 20 dB increase in perceived sound pressure level corresponds to a ten-fold improvement in energy efficiency. Of further significance is the use of rare earth magnets with correspondingly high energy product $(BH)_{max}$ (where B is the magnetic field density and H is the magnetizing force, the term $(BH)_{max}$ has the units of mega Gauss Oersted (MGOe), and is obtained from the B-H curve of the magnetic materials).

The magnets used in the system of the invention may be of any suitable shape. Preferably, however, the shape of the magnet is either cylindrical or generally conical. For individuals with normal hearing, a magnet weight of 5 to 20 mg is typically adequate. However, for persons with impaired hearing, greater magnet weights, for example 20 to 50 mg, may be required for adequate vibrations. Magnet weights of greater than 50 mg typically result in degradation of frequency response and are therefore undesirable.

Magnets that have been used in the system of the invention possess roughly a 2 to 1 diameter to length ratio. However, longer magnets (with a corresponding reduction in the diameter to length ratio) may improve the efficiency for reasons that will be explained later. By optimizing the various parameters described herein, the perceived sound pressure level in the range of 75 to 110 dBs is attainable. Frequency response ranging from 50 Hz up to 4000 kHz may be readily achieved in the system of the invention. Typical coil size in prior art devices is 2 to 10 millimeter long and 4 millimeters in diameter. Typical coil size in the system of the invention, on the other hand, is 20 centimeters or more in diameter.

Because of the large diameter of the driving coil relative to the size of the magnet in the system of the invention, the magnet is almost always positioned within a substantially uniform electromagnetic field. Movement of the magnet with respect to the coil position, for example, does not significantly affect the interaction between variations in the magnetic field strength and displacement of the magnet (i.e., equivalent sound pressure level). Rather than being displaced because of differences in flux density (gradient) at its respective poles in the system of the invention, the magnet is displaced as a result of the substantially uniform flux density acting on the respective poles in different directions. This causes an alignment force, and thus produces a rotating motion. The displacement of the magnet is therefore more akin to a rocking motion, rather than a linear displacement along its axis. For this type of motion, a longer magnet along the axis of the malleus may further improve the system of the present invention.

According to the present invention, private and inconspicuous sound perception is possible, since only wearers of transducers can perceive magnetic signals. If elimination or reduction of incoming acoustic signals is desired, this may be accomplished by plugging the ear while allowing the magnetic signals to penetrate and produce private sound perception. This is particularly useful in noisy environments such as inside vehicles, factories, construction sites, sports stadium, etc. An alternate example is found with loud environmental sounds where, for ear protection, an individual must muffle or block the sound completely. If such an individual wished to hear news, get directions, receive emergency instructions, or simply listen to music, a device according to the current invention would provide the opportunity to do so.

The inconspicuous hearing method of the current invention is also useful for hearing impaired persons, or persons with normal hearing who wish to receive audio information selectively. In one application, an individual who might want to receive a foreign language translation could temporarily use a signal producing means to impart the appropriate language to the individual and a contact transducer means. Other applications can involve systems in which an individual might want to receive certain direct information to the exclusion of others.

A significant aspect of the invention resides in the ability to combine, at the tympanic membrane, the direct incoming acoustic waves and the signal carried by the magnetic field. The absence of any object in the ear canal allows sounds to vibrate the ear drum without modification of the ear canal acoustic transfer function. In addition, the electromagnetic field can also vibrate the ear drum via the contact transducer. In effect, the two signals are mechanically summed at the ear drum. By providing an electromagnetic signal which is the sum of a desired acoustic signal and an inverted estimate of an acoustic noise signal reaching the ear drum directly, the noise signal can be cancelled. This noise cancellation technique can thus be used to increase the ratio of desired signal to acoustic noise. For example, the signal from a cellular telephone can be added to the inverse of the cabin noise of an automobile. This combined signal is then used to electromagnetically vibrate the contact transducer. By the law of super-position of mechanical vibrations, the resulting vibration will consist mainly of the cellular telephone signal.

Another example of an embodiment of the current invention is when a person with normal hearing wishes to attend a concert, but also wishes to listen to a sports event broadcast, without disturbing nearby concert-goers. With a hearing system according to the current invention, the person could simultaneously listen to both events; the first as directly perceived audio information, and the second through an electromagnetic transducer means. Additional examples of the latter situations include public fora, simultaneous broadcasts of two radio or television programs, etc.

In alternate embodiments of an inconspicuous hearing method according to the current invention, coils are not placed on the body of an individual, but are hidden in chairs, in the ceiling, in walls, etc. This completely frees the individual from having to wear any hardware other than an imperceptible transducer in the ear.

In one embodiment of the current application, all the functions of existing acoustic hearing aids could be duplicated in a system which remotely transmits magnetic fields to a tympanic membrane transducer. The advantages of such a hearing enhancement system for the hearing impaired are numerous.

First, for those who refuse to wear a hearing aid in or around the ear due to social stigmas associated with aging, disability, etc., a body-worn aid with a coil hidden under clothing worn around the neck according to the current invention would present an acceptable alternative.

Second, since an electromagnetic hearing aid according to the current invention can be worn on the body outside the ear and not in the ear, one could expect the utilization of more sophisticated speech processing technologies. It is not feasible to take advantage of such state-of-the-art developments with ear-level hearing aid packages, mainly due to the limited volume available.

Third, in those instances where it is not practical to wear a conventional hearing aid due to deformities or physical limitations, an electromagnetic hearing aid according to the current invention would again provide an acceptable alternative.

There are a number of additional applications for which the inconspicuous hearing system of the current invention is advantageous, some of which are discussed below. These and the previously discussed applications represent but a sampling of possible applications and are not intended to be comprehensive, as other applications should be obvious to those who are skilled in the relevant art.

An inconspicuous hearing system according to the current invention can not only amplify incoming acoustic sounds as do standard hearing aids, but can also receive and amplify special FM, AM, and RF signals. At present, such systems find application in theater or auditorium sound systems that have been especially developed for the hearing impaired. An illustration of a broadcast system according to the prior art is shown schematically in FIG. 3, View A.

In a typical auditorium or theater sound system, shown in View A of FIG. 3, audio sound source 302 or microphone 304 feed audio signals to amplifier 306. Audio sound source 302 may alternately comprise a tape, television broadcast, film, compact laser disk, etc. Amplifier 306 then drives auditorium speakers 308, thus emitting amplified acoustic signals 310 which can be perceived by individuals with normal hearing who perceive amplified acoustic signals 310 as sound. Alternately, in certain specialized auditorium and theater sound systems now in use, amplifier 306 can also drive transmitter 312, which in turn transmits audio-modulated signals 314. Through the use of an appropriately tuned hearing device, hearing impaired individuals can receive audio-modulated signals 314 and retransmit these signals as sound.

A listener shown receiving broadcast signals according to hearing aid technology of the prior art is schematically illustrated in View B of FIG. 3. In View B, listener 320 wears listening device 322 connected by connecting means 324 to receiver 326. Listening device 322 may further comprise a headset, headphones, earpiece, etc. Connecting means 324 typically comprises wires, cables, or other suitable means for physically connecting listening device 322 to receiver 326. Receiver 326 receives the audio modulated signals 314 broadcast by transmitter 312 of View B. Receiver 326 can receive frequency modulated (FM), amplitude modulated (AM) or infrared (IR) signals. Receiver 326 receives and decodes audio modulated signals 314, thereby enabling listener 320 to hear sounds generated at microphone 304 or audio sound source 302 of View A via an acoustic receiver.

View C of FIG. 3 illustrates an embodiment of the current invention that presents an alternative to the prior art acoustic hearing system of FIG. 3, View B. In View C, listener 340 wears electromagnetic transducer means 342 (not shown) supported on the tympanic membrane of ear 344, according to one embodiment of the current invention. Electromagnetic transducer 344 is responsive to magnetic field 346 generated by remote loop 348. Remote loop 348 produces magnetic field 346 responsive to audio modulated current shown at 354 flowing through connecting means 350 from source means 352. Source means 352 is analogous to prior art receivers that receive FM, AM or IR signals from an appropriate transmitter 312.

The embodiment illustrated in View C eliminates ear-level aids, headsets, wire-earpieces and other methods of providing amplified acoustic signals into the ear. Furthermore, a remote coil such as remote loop 348 can be placed into designated chairs, walls, ceilings, floors, etc. according to the current invention. This would completely free a hearing impaired person from having to carry any hardware other than an imperceptible transducer in the ear. A number of coil designs, according to different embodiments of the present invention, will be discussed below in greater detail.

Depending on the application for which a hearing system is designed, the sensitivity of a magnet or transducer according to the inconspicuous hearing method of the current invention will be determined by the intensity, gradient, and general shape of the magnetic field produced by a source means or coil of the current invention. For example, if a magnetic field is focused to affect a transducer within a small area, once a person wearing the transducer moved away from the target area, the field and hence the sound perception would rapidly diminish.

This type of focused, localized design is desirable in applications where a specific target area is needed to allow for multiple stimuli within the same general vicinity. One such embodiment of the current invention would be found in the case of several telephone operators, each communicating via a personal coil system with minimal cross-interference. A single or multiple coil system could be designed to achieve the desired localized effect as generally shown above in FIG. 1, and in FIGS. 4-6.

FIG. 4 illustrates one configuration for a source means or coil for providing audio signals to an electromagnetic transducer means according to one embodiment of the inconspicuous hearing method of the current invention. In this illustration, a conventional eyeglass frame has been especially adapted to form part of a continuous loop around the head of an individual. FIG. 4 shows eyeglasses 402 which contains a first wire section 404 as part of front section 406; a second wire section 408 along left glasses temple or reach 410; a third wire section 412 along right glasses temple or reach 414; and a fourth wire section 416 connected to second wire section 408 and third wire section 412. Fourth wire section 416 is sufficiently sized to be placed around the back of the head of the individual (not shown) who wears eyeglasses 402. In alternate embodiments of the current invention, there may be a plurality of such wire sections to comprise the complete loop.

Although only one loop of wire is shown for clarity in the embodiment of the present invention illustrated in FIG. 4, it should be realized that the loop shown may, in fact, consist of multiple turn wires. The size of the wire and the number of turns of wire in the loop thus employed will depend upon the hearing requirements of the individual wearer, and the physical requirements as described above.

A second configuration for providing audio signals to an electromagnetic transducer means worn by an individual according to the inconspicuous hearing method of the current invention, is illustrated schematically in FIG. 5. FIG. 5 shows listener 502 positioned between a first coil means 504 and a second coil means 506. Listener 502 wears a contact transducer according to the present invention (not shown). The current supplied to first coil means 504 and second coil means 506 through wires 508 and 510, respectively, are 180° out of phase with each other.

This double "push-pull" coil system as illustrated in FIG. 5 is an alternate design for a focused magnetic field according to the current invention, and represents one variation of the embodiment illustrated in FIG. 4 above. In alternate embodiments of the inconspicuous hearing method of the current invention, first coil means 504 and second coil means 506 can be positioned in individual workstation partitions, booth walls, signs, banners, etc., according to the physical constraints and requirements of the surroundings of listener 502.

A third embodiment of the current invention useful for a plurality of listeners within close proximity to one another is illustrated schematically in FIG. 6. Seated first listener 602, second listener 604, third listener 606, and fourth listener 608 FIG. 6 all wear electromagnetic transducers according to the current invention as shown 610, 612, 614 and 616, respectively. In close proximity to first listener 602 is first coil means 618; second coil means 620 is positioned close to second listener 604; third coil means 622 is positioned close to third listener 606; and fourth coil means 624 is similarly positioned close to fourth listener 608.

Optimal placement for coils 618, 620, 622 and 614 FIG. 6 will depend upon such factors as: the application for which individual listeners 602, 604, 606 and 608 are using electromagnetic hearing devices; the intensity of the electromagnetic field generated by each coil; whether or not it is desirable for each listener to hear separate simultaneous communications; the physical constraints of the environment for coil placement, etc. The illustration in FIG. 6 is thus suggestive, and in no way restricts the application of the electromagnetic hearing system according to the current invention.

Current speaker telephone (speaker-phone) systems of the present art feature a microphone and speakers on the main body of the telephone instead of on the telephone receiver handle. This allows for hands free operation. The problem with such a system is that feedback occurs due to the received acoustic signal feeding back to the microphone. Techniques to reduce or eliminate feedback include the use of directional microphones, which rely on directional properties to distinguish incoming sounds from speaker generated sounds. Recently, the most widely used technique is to suppress the bidiretional "duplex" mode of telephone communication and provide a one-way communication. This is accomplished electronically by sensing the level of the incoming signal and switching the communication direction appropriately.

In an alternate embodiment of the inconspicuous hearing method of the current invention (not pictured), a person wearing a magnet or electromagnetic transducer according to the current invention can privately and wirelessly communicate if the speaker was replaced by a loop or coil attached to the telephone. In such an embodiment, the coil is part of the main body of the telephone or, in an alternate embodiment, the coil is placed strategically under a table, in or on a wall, etc. The main advantage of this alternate speaker-phone is the enabling of duplex mode of communication without the feedback problem.

If such a coil is attached to a telephone, intercom, radio receiver, etc., an individual can receive private messages without other persons noticing. This could be important in certain business situations where, for example, it is important to keep track of the latest stock prices while participating in other activities.

Alternately, a uniform or non-focused field can be designed to allow for equal sound perception within a large area such as a room; a motorcoach, train car, or airplane cabin; an automobile; boat cabin; a sports arena; an auditorium; etc. Similarly, single or multiple coils can be used to achieve the desired intensity and uniformity. FIGS. 7 and 8 illustrate two such further embodiments for a coil or source means of the current invention.

FIG. 7 is a schematic illustration of a coil or source means for one form of uniform field configuration according to one embodiment of the current invention. First and second individuals 712 and 714 are located in room 716 that has been fitted with coil means 718 driven by amplifier 720. First individual 712 wears first electromagnetic transducer means 722 and second individual 714 likewise wears second electromagnetic transducer means 724.

In the embodiment of an inconspicuous hearing method according to the current invention illustrated in FIG. 7, coil means 718 is placed about the perimeter of the ceiling. Current supplied to coil means 718 generates magnetic field 726 in room 716 that will be perceptible to individuals 712 and 714 as sound due to vibrational movement against the tympanic membrane by electromagnetic transducer means 722 and 724, respectively. Alternate configurations are also conceivable for coil means 718. Individuals 712 and 714, or a plurality of individuals who similarly wear electromagnetic transducers, can perceive the same degree of loudness of sound transmissions within room 716.

A schematic illustration of an alternate uniform field configuration according to a second embodiment of the current invention is shown in FIG. 8. In FIG. 8, a plurality of loops 802 comprising a single solenoid 804 are placed in such a manner as to completely circumscribe room 806. Amplifier 808 provides the current to drive solenoid 804, thereby generating magnetic field 814. Listener 810 who wears electromagnetic transducer 812 in room 806 would thus perceive uniform sound throughout room 806 when electromagnetic transducer 812 experiences magnetic field 814.

Other applications for an inconspicuous hearing method according to the current invention may include the following. In those situations where cosmetic appearance is important, such as for media personnel; in conferences or conventions where clear sound reception is required throughout a large area; when listening to the simultaneous translation of a foreign language. Other applications include sports activities in which a player can have a coil or coils located in a helmet or under clothing. Football, skiing, jogging, bicycling, long distance running, etc., are typical examples. In noisy situations such as in airports or factories where environmental noise can be reduced by an acoustic ear plug, a hearing system of the present invention will also find application.

The foregoing disclosures and descriptions of the invention are illustrative and explanatory of the invention, and various changes in the size, shape, materials and components, as well as in the details of the illustrated construction, and placement method may be made without departing from the spirit of the invention, all of which are contemplated as falling within the scope of the appended claims. Without further elaboration, it is believed that one of ordinary skill in the art can, using the preceding description, utilize the present invention to its fullest extent.

REFERENCES

The following references have been cited in the present specification. All cited references are expressly incorporated by reference herein.

1. Goode, R. L., Audition via Electromagnetic Induction, *Arch. Otolaryngol.* (1973), 98, 23-26.
2. Goode, R. L., Current Status of Electromagnetic Implantable Hearing Aids, *Otolaryngologic Clinics of North America* (1989) 22(1), 201-209.
3. Hough, J. V. D., and DiCarlo, P., U.S. Pat. No. 4,774,933, Oct. 4, 1988, assigned to Xomed, Inc., Method and Apparatus for Implanting Hearing Device.
4. Rutschmann, J., Magnetic Audition—Auditory Stimulation by Means of Alternating Magnetic Fields Acting on a Permanent Magnet Fixed to the Eardrum, *IRE Transactions on Medical Electronics* (1959), 6, 22-23.

TABLE 1.

```
'* Geom-FarCoils
'
'* Geom-FarCoils Program Developed By Resound
'* Corporation, Adnan Shennib 1989.
'
'* This program will compute impedance, # of turns,
'* frequency response of a coil. Also computed is the
'* expected sound pressure level on a typical magnet 15-
'* 30 mg of 30-35 MGOe magnatized axially and attached to
'* the tympanic membrane.
'
'* This program was modified in Sep 1990 to give results
'* for distances exceeding 8 mm.
'
' Initialization
DEFSNG A-Z
CLS
D = .001
i = .01
ws = 36
od = 5 / 1000
id = 2.5 / 1000
wd = .0058 * 25.4 / 1000
cl = 10 / 1000
MU = 1
```

```
CID$ = "Not Specified"
'Main Loop
loopa:
CLS
PRINT
PRINT "COIL ID   ("; CID$; ") "; : INPUT TEMP$
IF TEMP$ <> "" THEN CID$ = TEMP$
PRINT "Select wire size AWG 30-56("; ws; ")"; : INPUT ws$
IF ws$ <> "" THEN ws = VAL(ws$)
'wire size table wdb=diameter of bare wire
'wd =  diamter of wire including insulation
IF ws = 21 THEN wdb = .0285: wd = .0294
IF ws = 22 THEN wdb = .0254: wd = .0263
IF ws = 23 THEN wdb = .0226: wd = .0235
IF ws = 24 THEN wdb = .0201: wd = .021
IF ws = 25 THEN wdb = .0179: wd = .0188
IF ws = 26 THEN wdb = .0159: wd = .0168
IF ws = 27 THEN wdb = .0142: wd = .0151
IF ws = 28 THEN wdb = .0126: wd = .0135
IF ws = 29 THEN wdb = .0113: wd = .0122
IF ws = 30 THEN wdb = .01: wd = .0109
IF ws = 31 THEN wdb = .0089: wd = .0097
IF ws = 32 THEN wdb = .008: wd = .0088
IF ws = 33 THEN wdb = .0071: wd = .0079
IF ws = 34 THEN wdb = .0063: wd = .0070
IF ws = 35 THEN wdb = .0056: wd = .0062
IF ws = 36 THEN wdb = .005: wd = .0056
IF ws = 37 THEN wdb = .0045: wd = .005
IF ws = 38 THEN wdb = .004: wd = .0045
IF ws = 39 THEN wdb = .0035: wd = .0039
IF ws = 40 THEN wdb = .0031: wd = .0035
IF ws = 41 THEN wdb = .0028: wd = .0031
IF ws = 42 THEN wdb = .0025: wd = .0028
IF ws = 43 THEN wdb = .0022: wd = .0025
IF ws = 44 THEN wdb = .002: wd = .0022
IF ws = 45 THEN wdb = .00176: wd = .00192
IF ws = 46 THEN wdb = .00157: wd = .00173
IF ws = 47 THEN wdb = .0014: wd = .00158
IF ws = 48 THEN wdb = .00124: wd = .0014
IF ws = 49 THEN wdb = .00111: wd = .00124
IF ws = 50 THEN wdb = .00099: wd = .00113
IF ws = 51 THEN wdb = .00088: wd = .00103
IF ws = 52 THEN wdb = .00078: wd = .00093
IF ws = 53 THEN wdb = .0007: wd = .00079
IF ws = 54 THEN wdb = .00062: wd = .0007
IF ws = 55 THEN wdb = .00055: wd = .00064
IF ws = 56 THEN wdb = .00049: wd = .00059 wdb = wdb * 25.4 / 1000        'convert to meters
wd = wd * 25.4 / 1000

PRINT "Select outer diameter in mm ("; od * 1000; ")"; :
INPUT od$
IF od$ <> "" THEN od = VAL(od$) / 1000

PRINT "Select inside diameter in mm ("; id * 1000; ")"; :
INPUT id$
IF id$ <> "" THEN id = VAL(id$) / 1000
```

```
nl = (od / 2 - id / 2) / wd        'number of layers.
Inl = INT(nl)
PRINT "Select coil length in mm ("; cl * 1000; ")"; :
INPUT cl$
IF cl$ <> "" THEN cl = VAL(cl$) / 1000
ntpl = INT(cl / wd)       'number of turns per layer
nt = ntpl * Inl
PRINT "Enter relative permeability ("; MU; ")"; : INPUT
MU$
'value other than 1 is not valid most of the time
IF MU$ <> "" THEN MU = VAL(MU$)
PRINT
PRINT "Total Number of turns = "; nt 'compute length cercum = 0
FOR j = 1 TO nl
cercum = cercum + (2 * 3.1416 * ((id / 2 + wd
- 1) * wd)))
NEXT j
tl = cercum * cl / wd
PRINT "Total Wire Length = "; USING "###.##"; tl; : PRINT
" meters"
dcr = tl * 1.724 / (3.1416 * ((wdb / 2) ^ 2) * (10 ^ 8))
PRINT "Resistance = "; USING "####.#"; dcr; : PRINT "
Ohms"
rav = (od / 2 + id / 2) / 2
rl = id / 2
b = (od / 2) - (id / 2)
lUh = (31.6 * (rav * nt) ^ 2) / ((6 * rav) + (9 * cl) +
(10 * b))
lUh = lUh * MU
lh = lUh / 10 ^ 6
PRINT "Inducatance = "; USING "###.#"; lUh / 1000; :
PRINT " mH"
f3db = (dcr / (2 * 3.14 * lh))
PRINT "3 dB roll off @ "; USING "#####"; f3db; : PRINT "
Hz"

n = nt
l = cl
R = (od / 2 + id / 2) / 2
'
PRINT
LOOP1:
PRINT "Enter Peak current in mA  ("; i * 1000; ")"; :
INPUT newma
IF newma > 0 THEN i = newma / 1000
LOCATE 17, 1
PRINT "DISTANCE    FLUX B    EQ SPL    CURRENT    V
POWER    V @ 4 Kz"
PRINT " in mm      in Gauss  in dB     in mA      in volts
in mW    in volts"
FOR lp = 1 TO 5
D = (lp * 2) ^ 3 / 1000
LOCATE 19 + lp, 2
```

```
PRINT USING "####"; D * 1000;
LOCATE 18, 2
Z = D + (1 / 2)
nPM = n / 1 x = (Z + (1 / 2)) / SQR(((R ^ 2) + (Z + 1 / 2) ^ 2))
Y = (Z - (1 / 2)) / SQR(((R ^ 2) + (Z - 1 / 2) ^ 2))
u = 4 * 3.14156 * 10 ^ (-7)
T = u * nPM * i * .5 * (x - Y)
b = T * 10000 * MU
LOCATE 19 + lp, 11
PRINT USING "#.####"; b;
IF b < .00001 THEN GOTO skiplog
dbspl = 98 + (20 * (LOG(b / 2) / LOG(10)))
skiplog:
LOCATE 19 + lp, 22
PRINT USING "###.#"; dbspl;
LOCATE 19 + lp, 30
PRINT USING "###.#"; i * 1000;
v = i * (SQR(dcr ^ 2 + (2 * 3.14 * 1000 * lh) ^ 2))
LOCATE 19 + lp, 40
PRINT USING "##.##"; v;
LOCATE 19 + lp, 50
PRINT USING "####.#"; i * v * 1000;    'power in mA
v = i * (SQR(dcr ^ 2 + (2 * 3.14 * 4000 * lh) ^ 2))
LOCATE 19 + lp, 59
PRINT USING "##.#"; v;
NEXT lp
LOCATE 1, 20
900 PRINT "PRESS E TO EXIT, ANY KEY TO CONTINUE";
1000 KEY$ = INKEY$: IF KEY$ = "" THEN 1000
KEY$ = UCASE$(KEY$)
IF KEY$ = "E" THEN END
GOTO loopa
```

What is claimed is:

1. A hearing system for inconspicuously producing audio signals perceptible to an individual, comprising,
   a. permanent magnet means having a surface for engaging the external surface of the tympanic membrane of an individual to releasably support said permanent magnet means thereon, said permanent magnet means being passively responsive to variations in a magnetic field to directly vibrate the tympanic membrane,
   b. a coil having an inner diameter larger than said individual's head; said coil being adapted to be supported in relation to said permanent magnet means such that said permanent magnet means is within a magnetic field produced by a current in said coil; and
   c. source means for providing a current to said coil which is representative of said audio signals and which is of sufficient magnitude to cause said permanent magnet means to vibrate the tympanic membrane.

2. A hearing system as defined in claim 1, further comprising, a transmission means for transmitting said audio signals to said source means.

3. A hearing system as defined in claim 1, wherein said transducer means is a passive device comprising a high energy permanent magnet.

4. A hearing system as defined in claim 1, in which said coil means is positioned on the body of an individual.

5. A hearing system as defined in claim 4, in which said coil means comprises a neck loop worn about the neck of an individual.

6. A hearing system as defined in claim 4, in which said coil means is supported in headgear.

7. A hearing system as defined in claim 1, in which said coil means is positioned off the body of an individual.

8. A hearing system as defined in claim 7, in which said coil means is placed in an article of furnishing.

9. A hearing system as defined in claim 7, in which said coil means is supported by a structural portion of a building.

10. A hearing system as defined in claim 7, in which said coil means is supported by a structural portion of a vehicle.

11. A hearing method for inconspicuously producing audio signals perceptible to an individual, comprising the steps of:
   a. releasably supporting permanent magnet means responsive to a magnetic field on the external surface of the tympanic membrane of the individual;
   b. positioning a coil means having an inner diameter at least as large as the individual's head remotely from said permanent magnet means; and c. supplying electrical current signals representative of said audio signals from a source means to said coil means to produce a magnetic field representative of said audio signals to induce vibrational motion in said permanent magnet means corresponding to said audio signals, said permanent magnet means thereby imparting said vibrational motion directly to the tympanic membrane.

12. A hearing method as defined in claim 11, wherein a radio frequency signal comprising said audio signals is transmitted from a transmission means to said source means.

13. A hearing method as defined in claim 11 wherein said coil means is positioned on the body of the individual.

14. A hearing method as defined in claim 13 wherein said coil means is positioned around the neck of the individual.

15. A hearing method as defined in claim 11, wherein said coil means is positioned off of the body of the individual.

16. A hearing method as defined in claim 15, wherein said coil means is placed in an article of furnishing.

17. A hearing method as defined in claim 15, wherein said coil means is placed in a structural portion of a building.

18. A hearing method as defined in claim 15, in which said coil means is placed on a structural portion of a vehicle.

19. A hearing method as defined in claim 11 wherein vibrational motion is induced in said permanent magnet means by means of a high energy permanent magnet interacting with the magnetic field produced by said coil means.

20. A hearing system for inconspicuously producing audio signals perceptible to an individual, comprising, a. permanent magnet means having a surface for engaging the external surface of the tympanic membrane of an individual to releasably support said permanent magnet means thereon, said permanent magnet means being passively responsive to variations in a magnetic field to directly vibrate the tympanic membrane, b. a coil having an inner diameter larger than said individual's head; said coil being adapted to be supported in relation to said permanent magnet means such that said permanent magnet means is within a magnetic field produced by a current in said coil; and c. source means for providing a current to said coil which is representative of said audio signals and which is of sufficient magnitude to cause said permanent magnet means to vibrate the tympanic membrane.

* * * * *